Sept. 27, 1960 W. D. LEWIS 2,954,432

ERROR DETECTION AND CORRECTION CIRCUITRY

Filed Oct. 30, 1957 2 Sheets-Sheet 1

INVENTOR
W. D. LEWIS
BY [signature]
ATTORNEY

ERROR DETECTION AND CORRECTION CIRCUITRY

Filed Oct. 30, 1957 2 Sheets-Sheet 2

INVENTOR
W. D. LEWIS
BY
ATTORNEY

United States Patent Office 2,954,432
Patented Sept. 27, 1960

2,954,432

ERROR DETECTION AND CORRECTION CIRCUITRY

Willard D. Lewis, Mendham, N.J., assignor to Bell Telephone Laboratories, Incorporated, New York, N.Y., a corporation of New York Filed Oct. 30, 1957, Ser. No. 693,451

11 Claims. (Cl. 178—23)

This invention relates to digital error detection and correction circuits.

In the transmission of digital signals over imperfect data links, it is often desirable to detect or correct errors in transmission. In the most elementary circuits of this type, each digit may be sent twice to provide error detection, or each digit may be sent three times to permit error correction on a two-out-of-three basis. More sophisticated error detection and correction circuits involving less redundancy have also been proposed. Thus, for example, as disclosed in R. W. Hamming et al., Reissue Patent 23,601, granted December 23, 1952, an additional check digit may be added to a binary code group to make the sum of the digits odd or even. Such an additional digit is called a parity check digit. At the receiver, a change in parity indicates that an error has been introduced in the code group. Through the use of additional parity check digits, the erroneous digit may be uniquely identified and corrected. Another disclosure relating to digital error detection and correction appears in an article entitled "Error Free Coding" by Peter Elias, pages 29 through 37, Transactions of the I.R.E., Professional Group on Information Theory-4, September 1954.

It has recently been determined that errors tend to occur in bursts. Thus, for example, if the normal rate of errors on a given data link is 1 in 100,000, the probability of the occurrence of a second error immediately after the first is much larger. For example, the probability may be in the order of 1 in 10. In a simple detection circuit using one parity check digit for a group of binary signals, double errors would remain undetected, because both the original code group and the erroneous code group would both be odd or even. In addition, many of the circuits of the prior art are relatively difficult to instrument, and the error correction circuits have characteristically required a relatively high ratio of check digits to information digits.

It is an object of the inventor to improve and simplify error detection or correction circuitry.

In accordance with an illustrative embodiment of the present invention, the foregoing object may be obtained through the use of two groups of parity check digits. The first group of parity check digits checks the parity of successive interleaved groups of information digits which are spaced apart by a predetermined number of digits which may be designated "N"; the second group of parity check digits checks sets of interleaved digits which are spaced apart by a different number of digits. The spacing of the digits over which the second check is made may advantageously be equal to $N+1$. Thus, each information digit is included in two independent parity checks, permitting immediate correction of signal errors. In addition, it is possible to detect many bursts of errors or multiple errors in the transmitted code group.

It is a feature of the invention that a parity check circuit for serial binary signals include a delay loop having more than one digit period of delay, and an exclusive-OR circuit and switching circuitry for periodically gating signals out of the delay loop connected in series in the delay loop. The exclusive-OR logic circuit, which produces output signals when either but not both of its two input leads is energized, has its output lead and one of its input leads connected in the delay loop.

In accordance with an additional feature of the invention, a data processing system is provided with an encoder and a decoder, each of which includes parity check circuits having delay loops and exclusive-OR circuits as described in the preceding paragraph, but wherein the two delay loops associated with each coding circuit include different amounts of delay.

In accordance with another feature of the invention, circuitry is provided for dividing information code group digits into interleaved sets in which the digits in each set are spaced apart by a preassigned number of digits, for adding to the original code group a check digit for each set of digits, for dividing the resultant composite code group into additional interleaved sets in which the digits in each set are spaced by a different number of digits, and for adding an additional check digit to the original code group for each of the additional sets of digits.

A complete understanding of this invention and of these and various other features thereof may be gained from consideration of the following detailed description and the accompanying drawing, in which.

Figure 1:
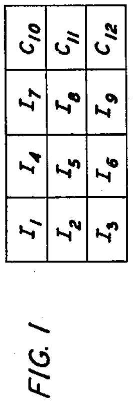
Figs. 1 and 2 are diagrams indicating the parity check groups included in a representative example of the instrumentation of the invention.
Figure 2:
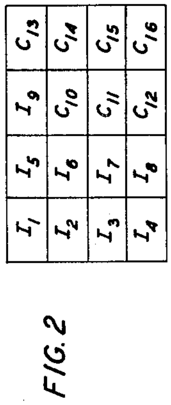

In the drawing, Fig. 1 and Fig. 2 are diagrams indicating the code groups which are employed in one illustrative implementation of the invention. In Figs. 1 and 2, the symbols $I_1$ through $I_9$ represent information digits, and the symbols $C_{10}$ through $C_{16}$ represent check digits. Although the example chosen for illustration utilizes only nine information digits and seven additional check digits for the sake of simplicity, the present invention is applicable to situations in which larger numbers of information and check digits are included in blocks of binary information.

In Fig. 1, the check digit $C_{10}$ indicates the parity of the information digits $I_1$, $I_4$, and $I_7$. This may be expressed mathematically by either of the following two equations:

$$I_1+I_4+I_7+C_{10}=0 \text{ Mod } 2 \quad (1)$$
$$I_1+I_4+I_7+C_{10}=1 \text{ Mod } 2 \quad (2)$$

Equation 1 set forth above represents even parity conditions, and Equation 2 set forth above represents odd parity conditions. The expressions "0 Mod 2" and "1 Mod 2" are mathematical expressions indicating that the sum is even or odd, respectively. With regard to the array shown in Fig. 1, it may be noted that the digits checked by $C_{10}$ are spaced three digits apart. Similarly, the check groups corresponding to the second and third horizontal rows in Fig. 1 include digits which are also spaced three digits apart.

Fig. 2 shows a second array of parity check groups which are formed by adding the check digits $C_{13}$ through $C_{16}$ to a re-arranged version of the first twelve digits of the code group. In Fig. 2, the check groups indicated by the horizontal rows each include four digits which are spaced four digits apart. Thus, the check digit $C_{13}$ forms a parity group with digits $I_1$, $I_5$, and $I_9$, and the additional check digits $C_{14}$, $C_{15}$, and $C_{16}$ are chosen to be in parity relationship with the three additional digits in the second, third, and fourth rows, respectively, of the matrix of Fig. 2.

Figure 3:
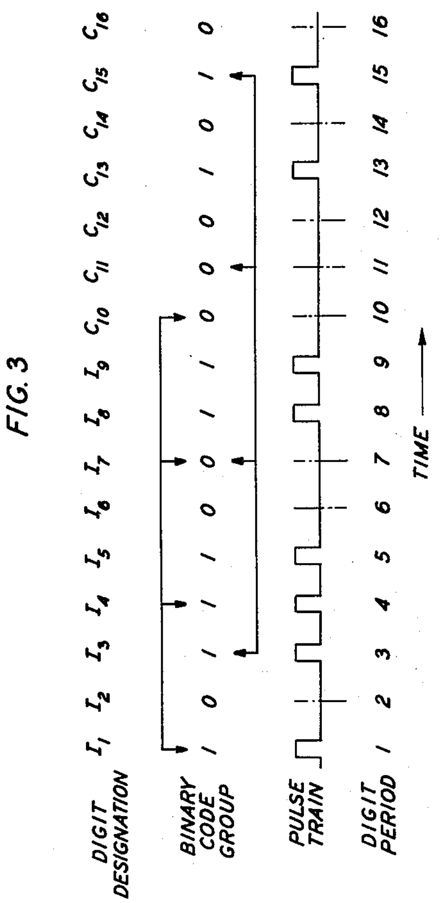
Fig. 3 is a diagram indicating the serial mode of operation of the present data processing apparatus.

The diagram of Fig. 3 is designed to indicate the serial mode of operation employed in the illustrative circuit implementation of the present invention. In Fig. 3, the sixteen binary digits are shown as the digits $I_1$ through $I_9$ and $C_{10}$ through $C_{16}$ in the upper horizontal row. In the second row of Fig. 3, a series of symbols representing information and check digits have been added. The horizontal line with four downwardly extending arrows indicates a parity check group corresponding to the first row in Fig. 1. In this example, $C_{10}$ has been chosen to give an even parity check. Thus, with the sum of digits $I_1$, $I_4$ and $I_7$ being even, the check digit $C_{10}$ must be equal to "0." If $I_7$ were changed from a "0" to a "1," the check digit $C_{10}$ would also be a "1" to make the sum even. The line having four upwardly extending arrows corresponds to the check group which appears in the third row of Fig. 2. In this case, the sum of the digits $I_3$, $I_7$, and $C_{11}$ is "1," and is odd, so $C_{15}$ must also be a "1" to produce an even sum. The other parity check digits $C_{11}$ through $C_{14}$ and $C_{16}$ are formed in the manner indicated above for check digits $C_{10}$ and $C_{15}$.

In serial binary data processing apparatus, binary information is characteristically represented by the presence or absence of pulses in successive digit periods. These digit periods, numbered 1 through 16, are indicated at the bottom of Fig. 3. The pulse train shown in Fig. 3 includes a pulse in those digit periods in which a "1" appears in the binary representation, and has no pulse present in digit periods in which a "0" appears in the binary representation. The complete pulse train shown in Fig. 3 therefore corresponds to the binary code group shown directly above the pulse train.

Figure 4:
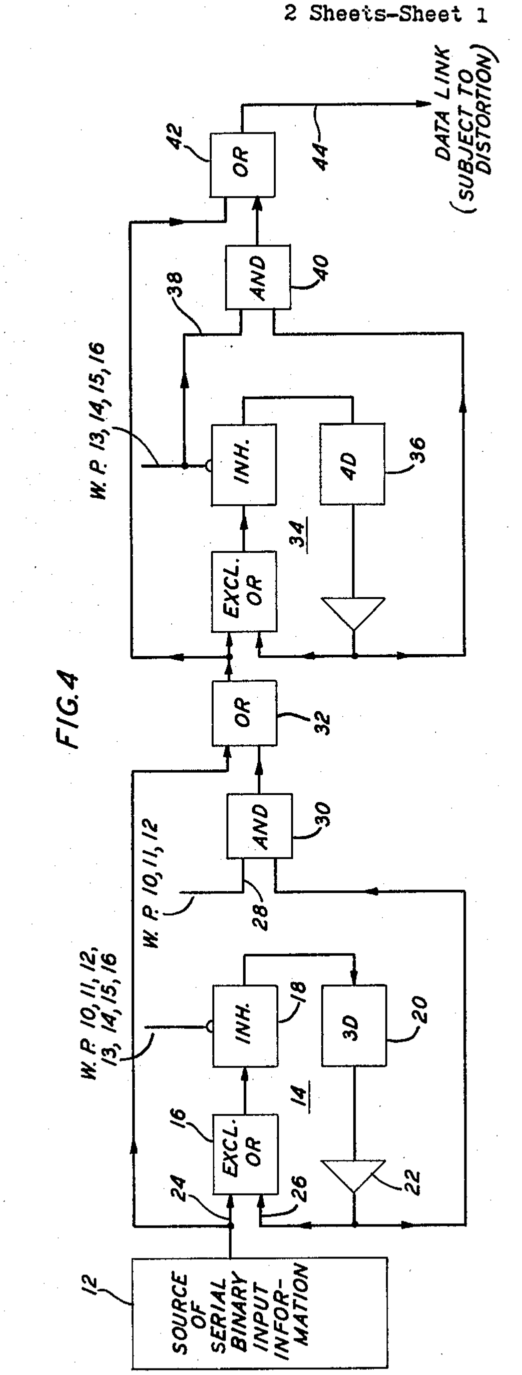
Fig. 4 is a logic circuit diagram of an encoder in accordance with an illustrative embodiment of the present invention.

In Fig. 4, a serial binary data processing circuit is shown which performs the encoding function described in connection with Figs. 1 through 3. In Fig. 4 and the following logic circuit diagram, a number of logic circuit building blocks are employed. These may take any of many known forms. For example, they may be implemented in accordance with an article by J. H. Felker entitled "Regenerative Amplifier for Digital Computer Applications" which appeared at pages 1584 through 1596 of the November 1952 issue of the Proceedings of the I.R.E., volume 40, No. 11.

Some of the building blocks which are employed include the AND unit, which produces output signals when all input leads are energized; the OR unit, which produces output pulses when any or all input leads are energized; and the inhibit unit, which has at least one normal input lead and an inhibiting input lead marked by a small semicircle at the point where it is connected to the block representing the inhibit unit. A pulse applied to a single normal input lead is transmitted through the inhibit unit, while a pulse applied to the inhibiting input lead over-rides other input signals and blocks output signals. In serial digital computing circuits, delay circuits having delay equal to various numbers of digit periods are often required. Such circuits are indicated by logic blocks including the letter D and a number indicating the number of digit periods of delay provided by the delay line. A memory unit, as disclosed in the Felker article, may include a delay loop having one digit period of delay. It can be set to either the "0" state or the "1" state. When it is in the "0" state, no output pulses are produced; however, when it is in the "1" state, circulating pulses produce output pulses in successive digit periods until the memory unit is reset to the "0" state. An exclusive-OR circuit is employed as a block in the present circuits. Such a circuit produces an output signal when either but not both of its two input leads are energized. It may be implemented, for example, through the use of two parallel inhibit units having their output leads connected to an OR circuit. Each input lead is connected to a normal input of one of the inhibit units and an inhibiting input terminal of the other circuit.

Figures 5, 6:
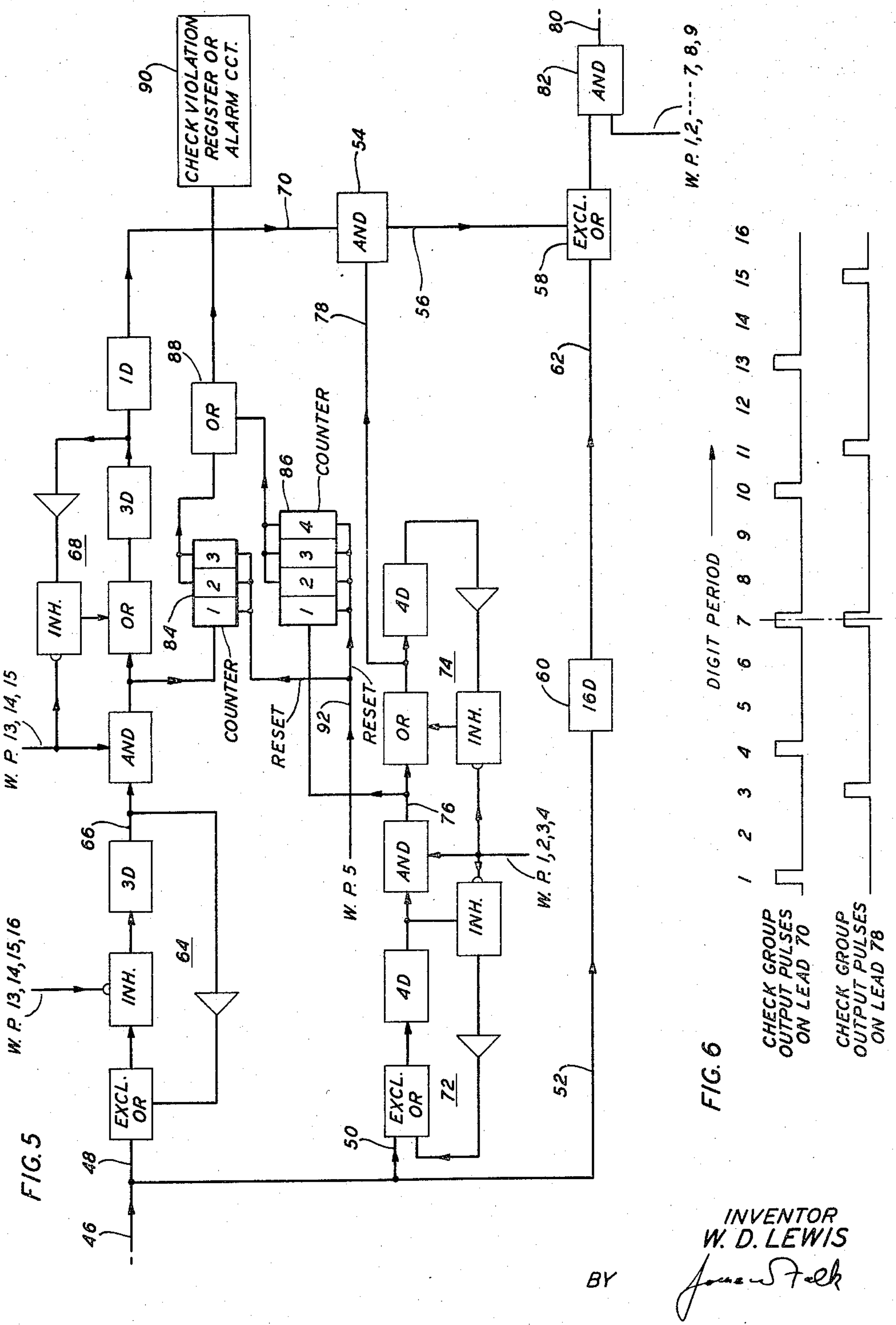
Fig. 5 is a logic circuit diagram of a decoder for use with the encoding circuit of Fig. 4.
Fig. 6 is a pulse diagram indicating the mode of operation of the circuit of Fig. 5.

In the circuits of Figs. 4 and 5, it will be assumed that properly timed pulses are available in any desired digit period. These pulses may, for example, be obtained through the use of a sixteen-stage ring counter connected to the output of a master timing pulse source. Properly timed "word pulses" appearing once every sixteen digit periods in any desired time slot are then available at the output leads of the ring counter. As disclosed in the Felker article, it is conventional to employ master timing, or "clock" pulses for timing in connection with many of the logic circuit components.

In Fig. 4, information digits are supplied from the signal source 12. The input digital signals are in the form of a pulse train in the first nine digit periods of the sixteen-digit period word shown in Fig. 3. The input information is applied to the delay loop 14 including the exclusive-OR circuit 16, the inhibit unit 18, the delay circuit 20, and the pulse regenerator 22. It is to be understood that the pulse regenerator may be included in one of the logic circuits. In addition, it is assumed that the logic and pulse regeneration circuitry introduces no delay, and that all of the delay is introduced by the delay line 20. The delay loop 14 therefore includes three digit periods of delay.

As the input information digits circulate through the delay loop 14, parity check information is developed in the following manner. In the first digit period, information digit $I_1$ is applied to input lead 24 of the exclusive-OR circuit 16. Following three digit periods, the pulse representing the digit $I_1$ appears at the other input 26 to the exclusive-OR circuit 16. Simultaneously with the arrival of signal $I_1$ on lead 26, the fourth information pulse $I_4$ appears at input lead 24 to the circuit 16. In view of the coincident inputs on leads 24 and 26, no output signal appears at the output of the OR circuit. Following three more digit periods, input signal $I_7$ appears on lead 24 and is combined with the sum Mod 2 of digits $I_1$ and $I_4$. In view of the fact that information digit $I_7$ is a "0," the resulting sum Mod 2 of digits $I_1$, $I_4$, and $I_7$ is still equal to "0."

During the digit periods between the calculation of the sum as mentioned above, other parity check digits are also being computed. While the exclusive-OR circuit 16 is performing logic operations on information appearing at leads 24 and 26, additional parity information is stored in the delay circuit 20. Following the application of the final information digit $I_9$ to the exclusive-OR circuit 16, the three check digits $C_{10}$, $C_{11}$, and $C_{12}$ are stored in the delay circuit 20. At this point, three pulses designated word pulses 10, 11 and 12 are applied to input lead 28 of the AND circuit 30. The three check bits $C_{10}$, $C_{11}$, and $C_{12}$ are therefore gated through AND circuit 30, and are combined with the original nine information digits in the OR circuit 32. The additional check digits $C_{13}$ through $C_{16}$ are developed in the delay loop 34, which includes substantially the same components as are included in delay loop 14. However, the delay circuit 36 included in delay loop 34 has four digit periods of delay, as contrasted with the three digit periods of delay included in circuit 20 associated with delay loop 14. This corresponds to the sampling of every fourth digit period indicated in Fig. 2, as contrasted with the sampling of every third digit period indicated in Fig. 1. Following the development of check bits $C_{13}$ through $C_{16}$, the check information is gated out of delay loop 34 by the application of four pulses in digit periods 13, 14, 15 and 16 to control lead 38 associated with AND unit 40. The check digits $C_{13}$ through $C_{16}$ are combined with the information digits and the other check digits in the OR circuit 42.

The output lead 44 from the OR circuit 42 is coupled to a data link which is subject to noise or other distortion.

This data link may include a long transmission channel, for example, or an imperfect memory circuit associated with a data processing system.

Fig. 5 is a logic circuit showing one possible instrumentation of a decoder for use with the encoder circuit of Fig. 4. In Fig. 5, the received signal is coupled from the input lead 46 to three branch circuits 48, 50, and 52. The logic circuitry associated with lead 48 determines the validity of the parity check groups including check digits $C_{10}$, $C_{11}$, and $C_{12}$. Similarly, the logic circuitry associated with lead 50 checks the validity of parity check groups associated with digits $C_{13}$ through $C_{16}$. The output signals from the two checking operations are correlated by the AND circuit 54 to produce correction signals on input lead 56 to the exclusive-OR circuit 58. During the operation of the parity group checking circuits associated with leads 48 and 50, the input signals have been delayed in the sixteen-bit delay circuit 60. During the next subsequent word period, the input signal is appearing at lead 62 of the exclusive-OR circuit 58 while correction information is applied simultaneously on lead 56. Whenever a correction pulse appears on lead 56, the binary digit applied on lead 62 to the exclusive-OR circuit 58 is changed from a "0" to a "1," or vice versa.

The operation of the parity group circuits associated with leads 48 and 50 will now be considered in somewhat greater detail, partly by reference to Fig. 6. Initially, it will be assumed that digit 7 has been received incorrectly. As indicated in Figs. 1 and 2, this will produce an error in the check group including digit $C_{10}$, and in the check group including digit $C_{15}$. At the output, the parity group check circuit associated with lead 48 includes the delay loop 64 which is similar in its mode of operation to the delay loop 14 of Fig. 4. However, it is operated for one additional cycle of three digit periods to include the check bits $C_{10}$ through $C_{12}$. Because an even parity check is employed, the absence of signals at lead 66 during digit periods 13, 14, and 15, when the parity group check information is gated out, indicates that no errors have been introduced into the transmitted code group. However, if any of the code groups include an erroneous digit, a pulse appears in the corresponding time slot. Thus, for example, a pulse on lead 66 during digit period 13 indicates an error in the group including check digit $C_{10}$. Similarly, errors in the parity check groups shown in the second and third rows of Fig. 1 would produce pulses on lead 66 during digit periods 14 and 15, respectively.

These error marking pulses are transferred to the delay loop 68, and are circulated in this loop during the first twelve digit periods of the next word period. Assuming, as mentioned above, that information digit $I_7$ has been received incorrectly, a pulse appears on lead 66 during digit period 13, is transferred to delay loop 68, and appears on lead 70 during digit periods 1, 4, 7, and 10 of the next subsequent word. This pulse pattern on lead 70 is shown as the upper pulse train in the diagram of Fig. 6.

The parity check group circuit associated with lead 50 includes a first delay loop 72 and a second delay loop 74. The delay loop 72 corresponds to the delay loop 34 of Fig. 4 in much the same manner that the delay loop 64 corresponds to the delay loop 14 in Fig. 4. Accordingly, all sixteen digits in the transmitted code group are aplied to the four digit period delay loop 72, and the pulses indicating errors in successive parity check groups are transferred to delay loop 74 on lead 76 during digit periods 1, 2, 3, and 4 of the next subsequent word period. The delay loop 74 has four digit periods of delay, and indications of erroneous digits are circulated in delay loop 74 in much the same manner as in delay loop 68. Using the assumption that the digit $I_7$ was changed in the course of transmission from the encoder of Fig. 4 to the decoder of Fig. 5, the parity check group shown in the third row of Fig. 2 and associated with check digit $C_{15}$ produces a parity check failure. This failure produces a pulse during the third digit period on lead 76. This pulse is circulated in delay loop 74, and appears on lead 78 in the third, seventh, eleventh, and fifteenth digit periods. This train of pulses is shown in the lower pulse train in Fig. 6.

In comparing the two pulse trains shown in Fig. 6, it may be seen that a coincidence of pulses on leads 70 and 78 occurs only during digit period 7. Accordingly, with reference to Fig. 5, an output pulse is applied on lead 56 to the exclusive-OR circuit 58 only during the seventh digit period. It is again noted that the incoming pulse group has been delayed sixteen digit periods by the delay circuit 60. Accordingly, digit $I_7$ appears at one input 62 of the exclusive-OR circuit 58 concurrently with the pulse from the AND circuit 54. The binary value of digit $I_7$ is therefore changed, and a corrected pulse group is applied to the output channel 80. The AND circuit 82 is provided to eliminate the check bits from the corrected message.

In addition to the single error correction circuits, the logic circuit of Fig. 5 includes circuitry for detecting multiple errors. This multiple error detection circuitry includes the counter circuits 84 and 86 and the OR circuit 88. The counter circuits 84 and 86 are designed to produce an output signal when two or more pulses are received by either circuit during a given word period. Thus, as error signals are transferred from delay loop 64 to delay loop 68, the counter 84 is advanced. If only one pulse is applied to counter 84, no signals are applied to the OR circuit 88 or to the check violation circuit 90. However, if two pulses are transferred from delay loop 64 to delay loop 68, the counter circuit 84 produces an output signal which is applied through the OR circuit 88 to circuit 90. In a similar manner, signals are applied to check circuit 90 if the counter circuit 86 receives two or more pulses in the course of the transfer of information from delay loop 72 to delay loop 74. Pulses are supplied on lead 92 during the fifth digit period of each word to reset the counter circuits 84 and 86 to their initial counting states.

Further, if desired, successive errors may be corrected as set forth in application Serial No. 693,452, filed October 30, 1957, of W. D. Lewis and A. C. Rose.

In the encoder and decoder circuits of Figs. 4 and 5, it is assumed that synchronization signals are applied to both of the two circuits, with the master control being located at one terminal and a synchronization channel being provided. Alternatively, special synchronization signals may be sent over the information channel and circuitry may be provided in accordance with conventional practice to maintain synchronism of encoder and decoder circuits.

In the example of the invention shown in the drawing and discussed above, the original group of information digits number 9, and the digits in the final code group number 16. Thus, in the selected example, nine information digits and seven check digits are included in each code group. The redundancy of a message made up of such code groups is unnecessarily high, and can be readily reduced by increasing the size of the array. In this regard, it is particularly to be noted that increasing the size of the array requires only that the delay of a few delay circuits be increased.

It may also be noted that the selected number of information digits is the square of an integer. This selection is made to reduce the redundancy of the completed message, as the ratio of check digits to total digits is roughly proportional to the ratio of one-half the periphery of a rectangle (representing the matrix) to the area of the rectangle. Thus, in Fig. 1, it would be possible to use a matrix of information digits which is not square. However, if the original array departs significantly from a square, the redundancy of the message tends to increase, for matrices including a given number of digits.

It is to be understood that the above-described arrangements are illustrative of the application of the principles of the invention. Numerous other arrangements may be devised by those skilled in the art without departing from the spirit and scope of the invention.

What is claimed is:

1. In combination: a source of serial binary information digits; a check digit encoder coupled to said source; a decoder circuit; and a data link subject to distortion interconnecting said encoder and said decoder; said encoder including means for providing a first group of check digits including interleaved sets of information digits spaced apart by a first preassigned number of digits, and means for providing a second group of check digits including interleaved sets of said information and said first group of check digits spaced apart by a different preassigned number of digits; said decoder including means for checking the validity of the parity checks including said first group of check digits, means for circulating signals indicating the results of said checks in a delay loop having a delay in digit periods equal to said first preassigned number of digits, means for checking the validity of the parity checks including said second group of check digits, means for circulating signals indicating the results of said last-mentioned checks in a delay loop having a delay in digit periods equal to said second preassigned number of digits, a correction circuit, means for applying received signals to said correction circuit concurrently with the circulation of error signals derived from said received signals in said delay loops, and means coupled to the output of said delay loops for actuating said correction circuit upon the simultaneous occurrence of error signals at the outputs of said two delay loops.

2. In combination in a digital system, a source for providing a train of electrical information signals in successive digit positions, first circuit means responsive to information signals which are spaced N digit positions apart, where N is an integer equal to or greater than 2, for deriving from said spaced information signals a first group of N check signals, first combining means for adding said N check signals to said train of electrical information signals in digit positions which immediately follow those in which said information signals occur to provide a modified train of electrical signals, second circuit means responsive to signals in said modified train which are spaced $N+1$ digit positions apart for deriving from said spaced information and check signals a second group of $N+1$ check signals, and second combining means for adding said $N+1$ check signals to said modified train of electrical signals in digit positions which immediately follow those in which the signals of said modified train occur to provide an output train.

3. In a parity check circuit for a serial binary data processing apparatus in which electrical signals appear in successive digit periods, a first delay loop including an exclusive-OR circuit and having a predetermined number of digit periods of delay, a second delay loop also including an exclusive-OR circuit and having a different number of digit periods of delay, a source of serial binary digital signals, means for applying said signals to both of said delay loops, signal combining circuitry, and means for applying the original input signals and output signals from said first and second delay loops to said signal combining circuitry.

4. A decoder as defined in claim 2 wherein said signal combining circuit includes means for determining coincident output signals derived from said first and second delay loops, and means for correcting the original received signals upon the occurrence of coincident pulses from said two delay loops.

5. An encoder as defined in claim 3 wherein an output circuit is provided and wherein said signal combining circuitry includes means for applying the original signals and the output signals from said first and second delay loops successively to said output circuit.

6. In a parity check circuit for a serial binary data processing apparatus in which electrical signals appear in successive digit periods, an encoder; a decoder; and a data link interconnecting said encoder and said decoder; each of said encoder and decoder including a first delay loop including an exclusive-OR circuit and having a predetermined number of digit periods of delay, a second delay loop also including an exclusive-OR circuit and having a different number of digit periods of delay; a source of serial binary digital signals; means for applying said signals to said delay loops; signal combining circuitry; and means for applying the original input signals and output signals from said first and second delay loops to said signal combining circuitry.

7. A combination as in claim 2 further including decoding means for receiving the information and check signals in said output train and for checking the correspondence between the received information and check signals.

8. In combination in a digital system, a source for providing a train of electrical information signals in successive digit positions, first circuit means responsive to information signals which are spaced apart by a predetermined number of digit positions for deriving from said spaced information signals a first group of check signals, first combining means for adding said check signals to said train of information signals to provide a modified train of electrical signals, second circuit means responsive to signals in said modified train which are spaced apart by a different predetermined number of digit positions for deriving from said spaced information and check signals a second group of check signals, and second combining means for adding said second group of check signals to said modified train of electrical signals to provide an output train of signals.

9. A digital decoder circuit comprising means for supplying coded signals, first and second error check circuits, a correction circuit, means for applying said coded signals to said first and second check circuits and to said correction circuit, said first error check circuit including a first delay loop having a predetermined number of digit periods of delay and means for circulating error signals derived from said coded signals in said first delay loop, said second error check circuit including a second delay loop having a different predetermined number of digit periods of delay and means for circulating error signals derived from said coded signals in said second delay loop, and means responsive to the simultaneous occurrence of error signals at the outputs of both of said first and said second delay loops for actuating said correction circuit.

10. A combination as in claim 8 further including decoding means for receiving the information and check signals in said output train and for checking the correspondence between the received information and check signals.

11. In combination in a digital system, a source for providing a train of electrical information signals in successive digit positions, first circuit means responsive to information signals which are spaced apart by a predetermined number of digit positions for deriving from said spaced information signals a first group of check signals, second circuit means responsive to information signals which are spaced apart by a different predetermined number of digit positions for deriving therefrom a second group of check signals, and means for combining said first and second groups of check signals with said train of information signals.

References Cited in the file of this patent

UNITED STATES PATENTS

| | | |
|---|---|---|
| 2,552,629 | Hamming et al. | May 15, 1951 |
| 2,653,996 | Wright | Sept. 29, 1953 |